W. B. JACKSON.
SPEED CHANGING MECHANISM.
APPLICATION FILED MAR. 9, 1917.
1,237,910.
Patented Aug. 21, 1917.
6 SHEETS—SHEET 1.
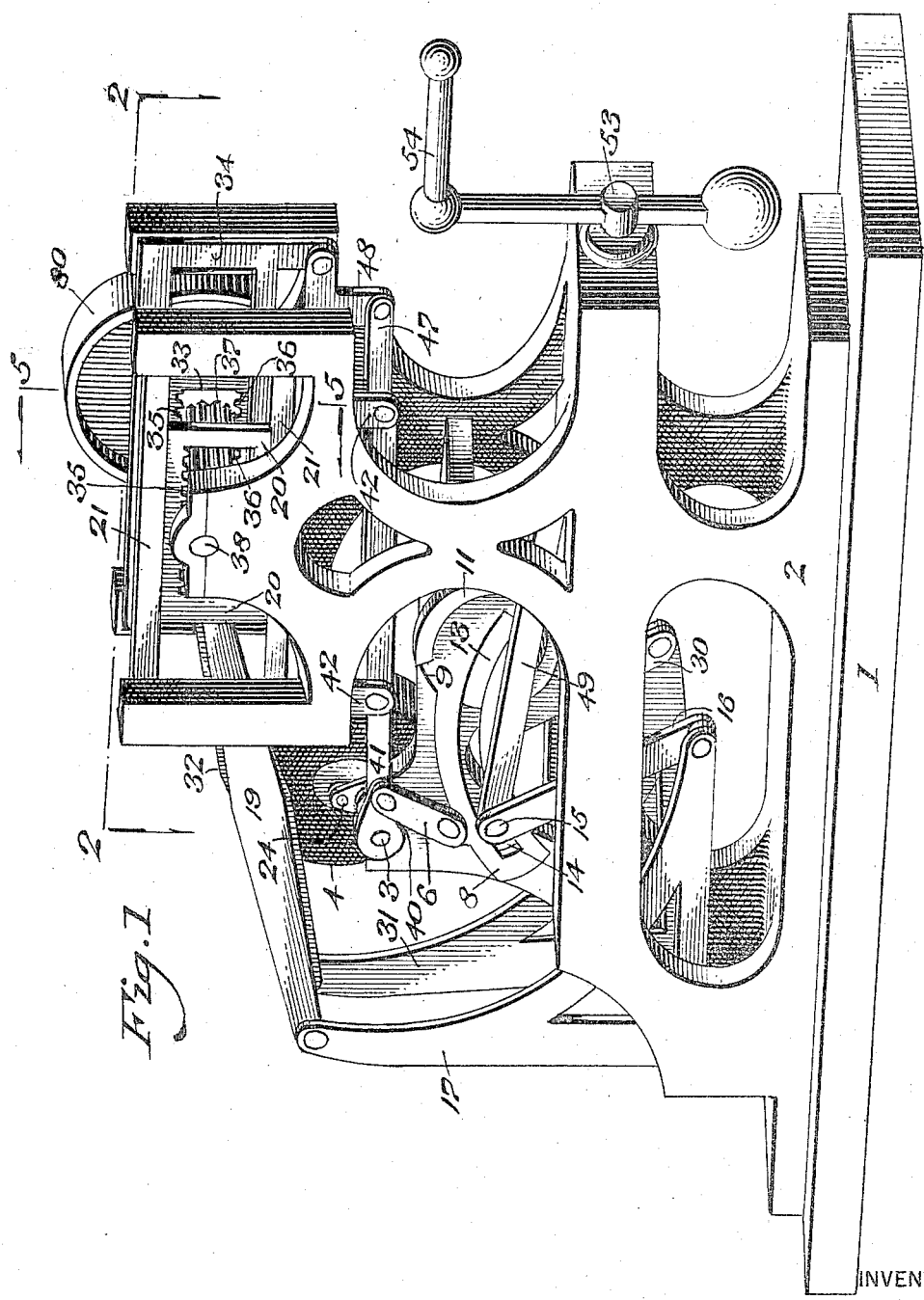
INVENTOR
Walter B. Jackson,
BY Niederhauser Fairbanks,
ATTORNEYS

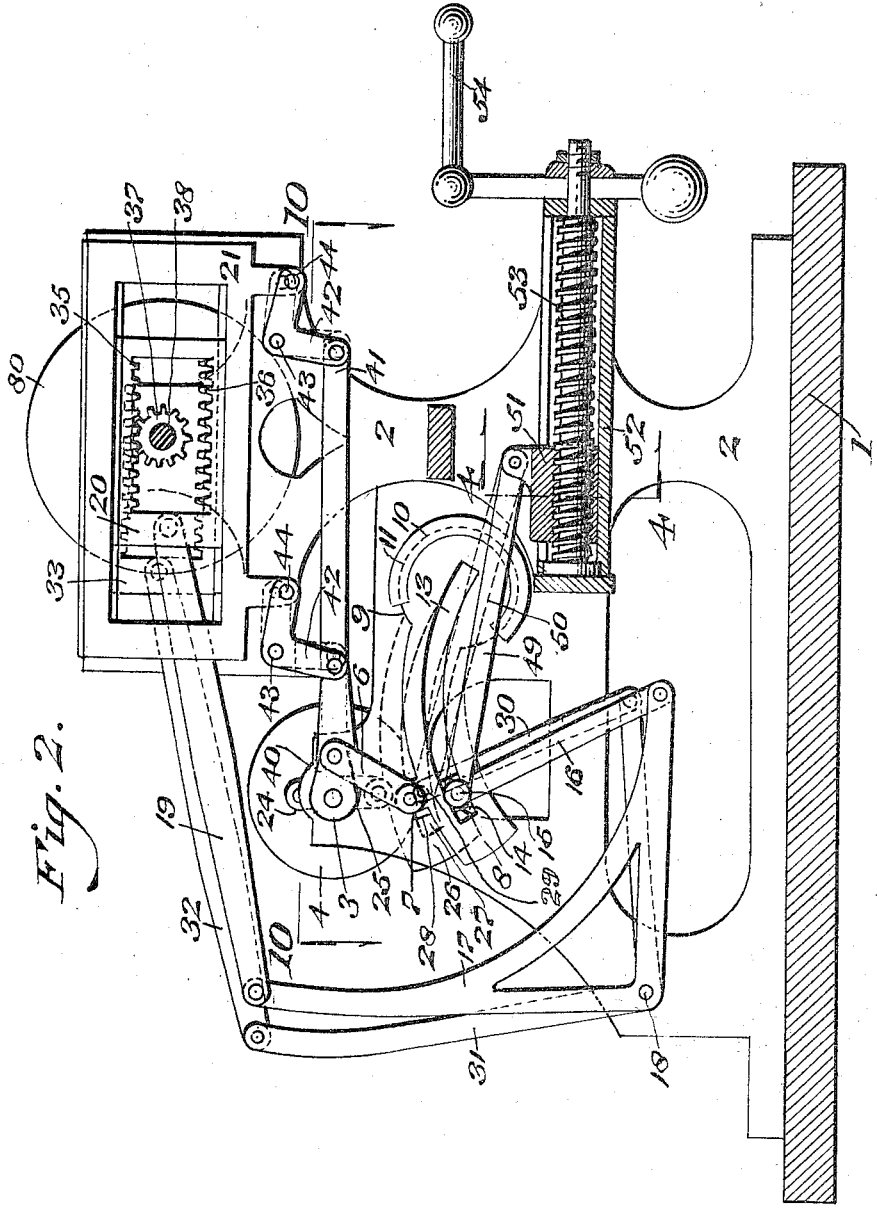

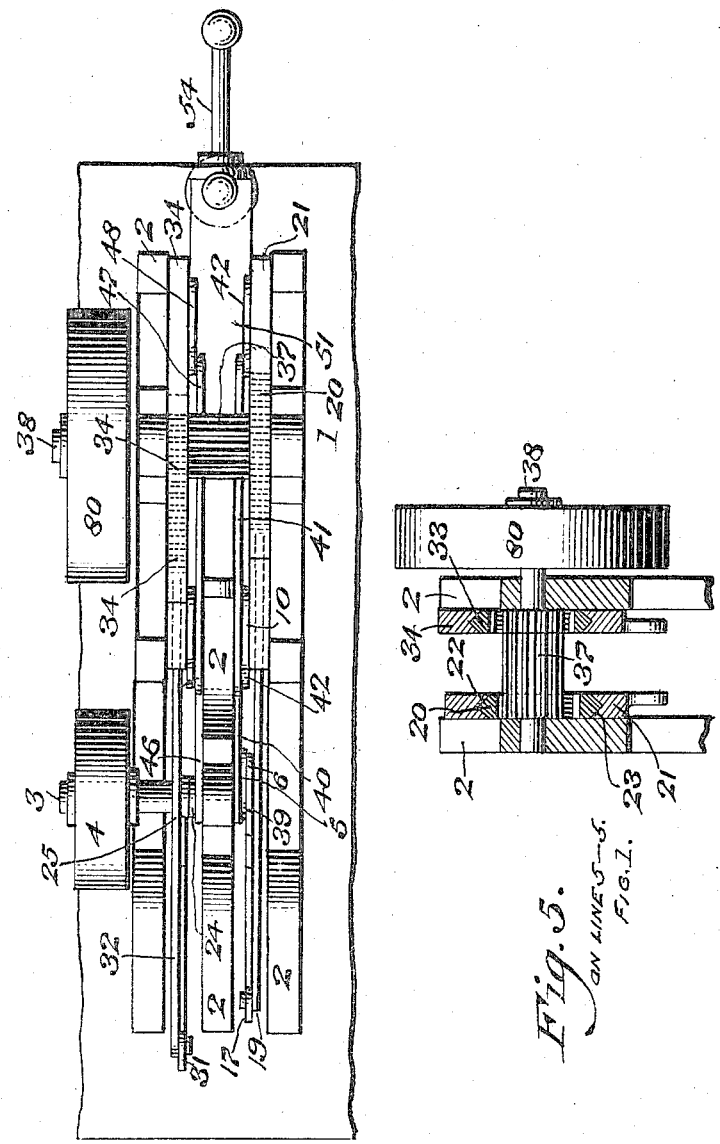

W. B. JACKSON.
SPEED CHANGING MECHANISM.
APPLICATION FILED MAR. 9, 1917.

1,237,910.

Patented Aug. 21, 1917.
6 SHEETS—SHEET 4.

INVENTOR
Walter B. Jackson.
BY Niedersheim Fairbanks
ATTORNEYS

W. B. JACKSON.
SPEED CHANGING MECHANISM.
APPLICATION FILED MAR. 9, 1917.
1,237,910.
Patented Aug. 21, 1917.
6 SHEETS—SHEET 5.
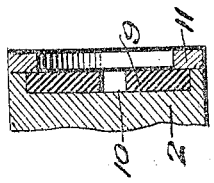
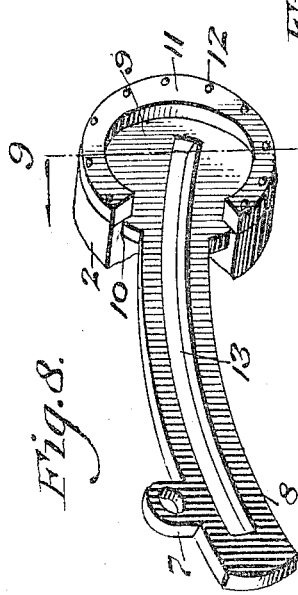
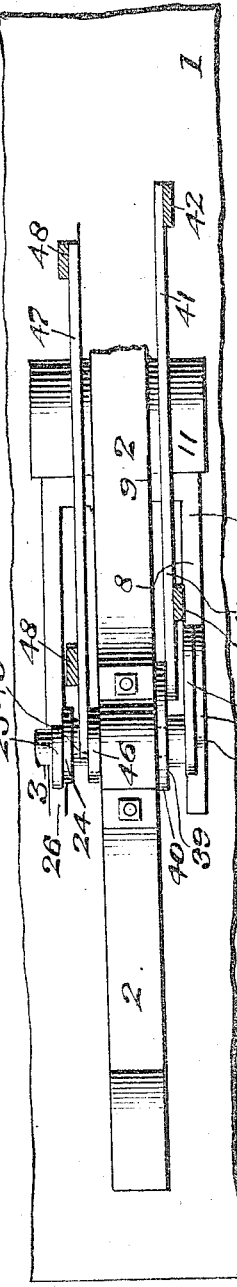
INVENTOR
Walter B. Jackson.
BY
ATTORNEYS

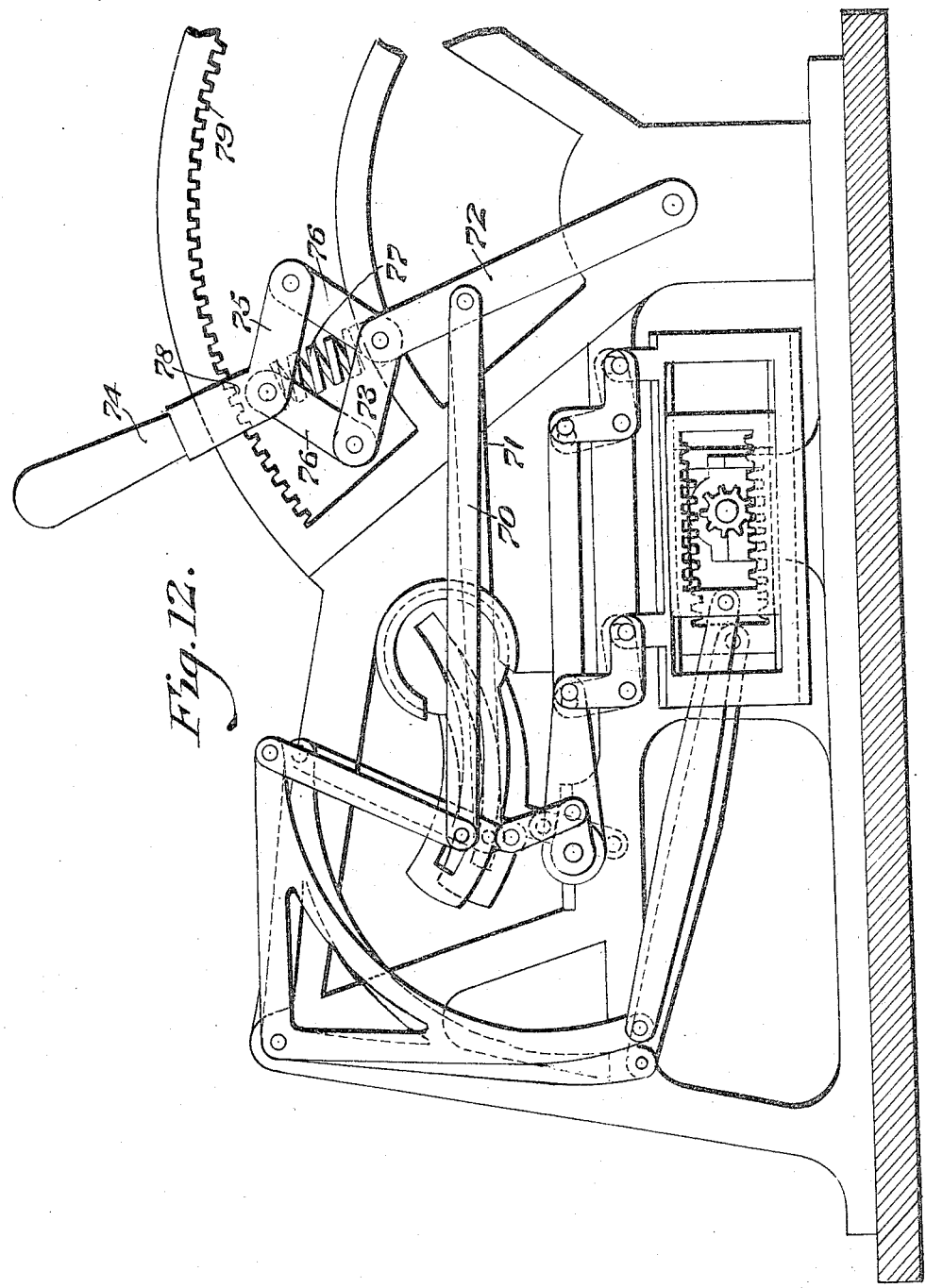

UNITED STATES PATENT OFFICE.

WALTER B. JACKSON, OF PHILADELPHIA, PENNSYLVANIA, ASSIGNOR OF ONE-THIRD TO HARPER F. SMITH AND ONE-THIRD TO CHARLES H. AUKETT, BOTH OF PHILADELPHIA, PENNSYLVANIA.

SPEED-CHANGING MECHANISM.

1,237,910.   Specification of Letters Patent.   Patented Aug. 21, 1917.

Application filed March 9, 1917. Serial No. 153,625.

*To all whom it may concern:*

Be it known that I, WALTER B. JACKSON, a citizen of the United States, residing in the city and county of Philadelphia, State of Pennsylvania, have invented a new and useful Speed-Changing Mechanism, of which the following is a specification.

My present invention consists of a novel speed changing mechanism, wherein novel means are provided for causing the driven element to travel at any desired ratio of speed relative to the driving element.

It further consists of a novel construction of connecting mechanism and novel means to adjust it.

Other novel features of construction and advantage will hereinafter appear in the detailed description and the appended claims.

For the purpose of illustrating my invention, I have shown in the accompanying drawings, typical embodiments thereof which are at present preferred by me, since these embodiments will give in practice satisfactory and reliable results, although it is to be understood that the various instrumentalities of which my invention consists can be variously arranged and organized and that my invention is not limited to the precise arrangement and organization of these instrumentalities as herein shown and described.

Figure 1 represents a perspective view of a speed changing mechanism embodying my invention.

Fig. 2 represents a sectional elevation, the section being taken in part on line 2—2 of Fig. 1.

Fig. 3 represents a top plan view of my device.

Fig. 4 represents a section on line 4—4 of Fig. 2.

Fig. 5 represents a section, substantially on line 5—5 of Fig. 1.

Fig. 8 represents, in perspective, a portion of the stroke adjusting means.

Fig. 9 represents a section on line 9—9 of Fig. 8.

Fig. 10 represents a section substantially on line 10—10 of Fig. 2, certain parts being omitted for the sake of clearness of illustration.

Fig. 11 represents, in side elevation, another embodiment of my invention.

Fig. 12 represents a sectional elevation of another embodiment of my invention.

Similar numerals of reference indicate corresponding parts in the figures.

Referring to the drawings:—

Figure 6:
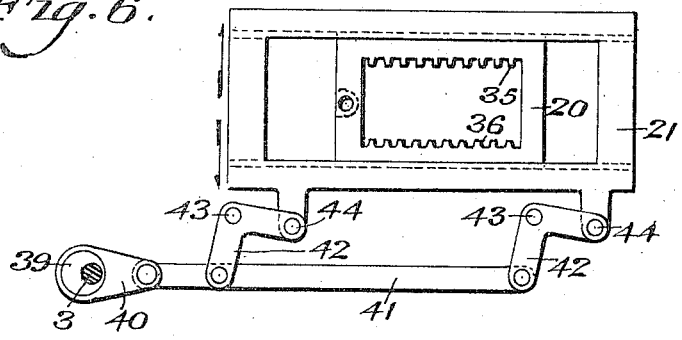
Fig. 6 represents, in detached position and in side elevation, a rack frame and means for raising and lowering it.

1 designates a base plate on which is mounted a housing 2, it being understood that in practice, the housing 2 is connected to any type of a support, either stationary or movable, in accordance with the conditions and requirements met with in practice. Journaled in the housing 2 in any desired manner is a driving shaft 3 which is provided with a pulley 4, thereby adapting the driving shaft to be connected to any desired source of power. The driving shaft 3 has secured thereto a crank arm 5, to the end of which is pivotally connected a link 6, which is also pivotally connected to the ear or lug 7 of an arm 8, said link being connected near the forward end of said arm. The rear end of said arm 8 is substantially cylindrical in contour, as indicated at 9, and is rotatable in a recess 10 in the housing 2, and is retained therein by means of a ring-like member 11 secured to the housing by fastening devices 12.

The arm 8 is provided with a curved slot 13 in which is slidable a shoe 14 which carries a pin 15. 16 designates a link, one end of which is pivotally mounted on the pin 15, while its opposite end is connected to an elbow lever 17, which is pivoted at 18, to the housing 2. The other end of the elbow lever 17 has pivotally connected therewith, a connecting rod 19, one end of which is connected to a rack 20 which is slidable in the movably mounted rack frame 21, in any desired manner.

In the form illustrated in Fig. 5, the top and bottom of the rack are each provided with a substantially V-shaped face which coöperates with similar shaped faces on the rack frame, as indicated at 22 and 23, respectively. A plurality of racks, rack frames, and connections to the driving shaft 3 are employed, which are constructed in a similar manner, but are connected in such a manner that one set has a lead over the other set. Mounted on the driving shaft 3 at an angle of 90° to the crank arm 5 is a crank arm 24 which is connected by means of a link 25 to an arm 26 having one end mounted for rotation in a vertical plane. The arm 26 is provided with a curved slot 27 in which is mounted a shoe 28 which carries a pin 29, to which is connected a link 30, which is also connected to an elbow lever 31 fulcrumed at 18. This elbow lever 31 has connected thereto one end of a connecting rod 32, the other end of which is connected to a rack 33, which is slidable in a rack frame 34 in a similar manner to that already described with respect to the rack 20 and the rack frame 21.

Each of the racks 20 and 33 is provided with an upper and lower set of rack teeth 35 and 36, respectively, which are adapted to alternately engage a gear 37 mounted on a driven shaft 38 journaled in the housing. The shaft 38 is connected in any desired manner to the mechanism to be driven, and in order to illustrate one manner of doing this, the driven shaft 38 is illustrated as being provided with the pulley 80.

I provide means to effect at the proper time the raising and lowering of the rack frames, so that when one frame is raised, another frame will be lowered, so that one or the other of the rack teeth of a rack will be in mesh with the driven gear 37. The driving shaft 3 is provided with an eccentric 39, which coöperates with an eccentric strap 40 which is connected to a rod 41, said rod being pivotally connected with bell-crank levers 42 which are fulcrumed at 43 to a fixed support, such as the housing, and which are pivoted, as at 44, to the rack frame 21.

The driving shaft 3 has mounted thereon an eccentric 45 around which passes an eccentric strap 46 which is connected to an arm 47, to which is pivoted one end of the bell-crank levers 48, the other ends thereof being pivoted to the rack frame 34, see Fig. 1. The pins or stud shafts 15 and 29 are connected by the arms 49 and 50, respectively, to a shoe 51 which is slidably mounted in a guide 52 carried by the housing 2. The shoe 51 is adapted to receive a screw 53 which is rotatably carried by the housing or the guide 52 and is prevented from longitudinal movement therein in any desired manner. Secured to the worm 53 is an actuating crank 54.

In the embodiment seen in Fig. 11, I have shown means for reversing the direction of movement of the racks and thereby the direction of rotation of the driven shaft. Each oscillating member is connected by a link 55 which is connected to one end of an elbow lever 56, which is connected by a link 57 to a plate 58 pivoted at 59 and provided with a slot 60.

61 designates a pin slidable in the slot 60 and having connected to it an arm 62 pivoted to a link 63, the other end of which is secured to a fixed pivot 64. Also pivoted to the arm 62 and the link 63 is an arm 65 pivoted to an elbow lever 66 which is secured to its rack 67. 68 designates an arm, one end of which is connected to the pin 61 and the other end of which is connected to a spring actuated lever 69.

In the embodiment seen in Fig. 12, the construction and arrangement of parts is similar to that seen in Fig. 1, except as to the location of the parts and the means for regulating the position of the shoes in the oscillating members. Instead of having the pins or stud shafts carried by the oscillating members, such as 8 and 26, and connected to a worm controlled shoe, I provide the arms 70 and 71 which are connected to such stud shafts and to a lever 72 which is fulcrumed at its lower end and bent, as at 73.

74 designates a handle lever which is bent, as at 75, and such bent portions 73 and 75 are connected by the links 76. Interposed between the levers 74 and 72 is a spring 77. The handle lever 74 is provided with the teeth 78, which intermesh with the rack segment 79. The construction seen in Fig. 12, as to the operating mechanism, is of the same construction as that seen in Fig. 2 except that it is turned upside down, and a detailed description of the construction and operation would involve needless repetition and is therefore omitted.

Figure 7:
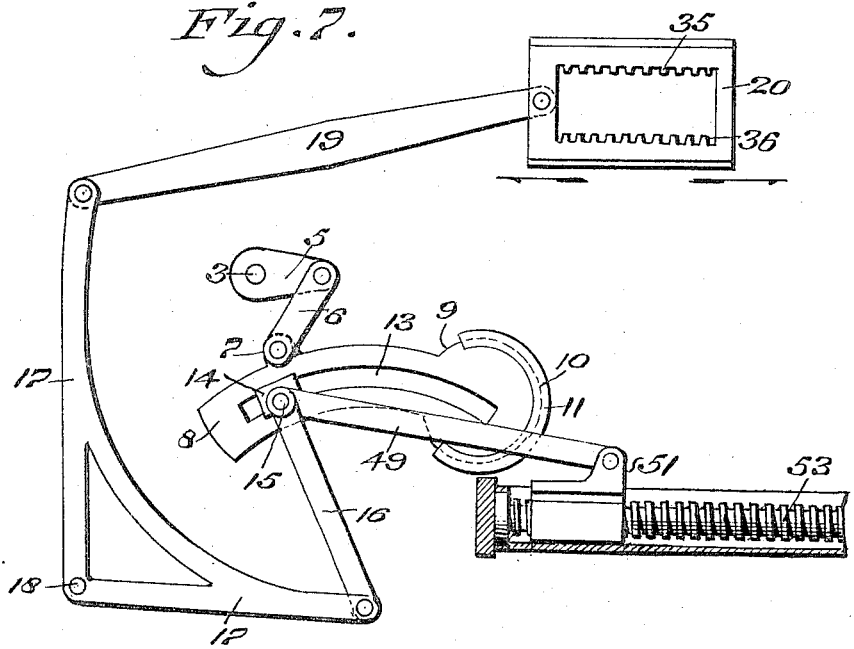
Fig. 7 represents, in detached position and in side elevation, a rack frame, its reciprocating means, and its adjusting means.

The operation of my novel speed changing mechanism will now be apparent to those skilled in the art and is as follows:

After the position of the shoes in the oscillating members 8 and 26 have been adjusted, a definite relative speed is maintained between the driving and driven shafts. This adjustment, in the embodiment seen in Figs. 1 to 10 inclusive, is effected by actuating the crank 54 to rotate the worm 53 and thereby longitudinally adjust the shoe 54, which is operatively connected to the shoes carried by the oscillating members 8 and 26. In the form seen in Fig. 11, the direction of rotation of the driven shaft is reversed by actuating the handle lever 69. In Fig. 12, this adjustment is effected by moving the handle lever 74 downwardly, then giving to it the desired movement so that upon the release of the handle lever 74, the teeth 78 will engage with the desired teeth of the rack 79. As the driving shaft 3 revolves, the oscillating members 8 and 26 are moved up and down, and since they are operatively connected with their respective racks, such racks are reciprocated, one rack moving forwardly, while the other rack is moving rearwardly. The rack frames which carry the racks are alternately raised and lowered, it being seen that as the eccentric 39 on the driving shaft 3 revolves, the arm 41 will be reciprocated, thereby causing the rack frame 21 to alternately rise and fall, thereby raising and lowering its rack 20. The same action takes place with respect to the rack frame 34 and its rack 33.

During the forward movement of a rack, its lower teeth are in mesh with the gear 37 and during its rearward movement, the upper teeth of a rack are in mesh with the gear 37.

By the employment of the construction seen in Fig. 11, it will be apparent that the oscillating arms are directly connected to the rack frames so that instead of the rack frames being controlled by an eccentric drive from the driving shaft, they are controlled by the oscillating arms.

It will also be apparent that in this construction as seen in Fig. 11, by actuating the operating lever, the direction of movement of the rack frames will be reversed, the result of which will be that the driven shaft will rotate in a reverse direction.

It will now be apparent that I have devised a novel and useful speed changing mechanism, which embodies the features of advantage enumerated as desirable in the statement of the invention and the above description, and while I have, in the present instance, shown and described typical embodiments thereof which will give in practice satisfactory and reliable results, it is to be understood that these embodiments are susceptible of modification in various particulars without departing from the spirit or scope of the invention or sacrificing any of its advantages.

Having thus described my invention, what I claim as new and desire to secure by Letters Patent, is:—

1. In a speed changing mechanism, a driving shaft, a driven shaft, a gear on said driven shaft, a plurality of racks each having sets of teeth to alternately engage said gear, connecting mechanism coöperating with said driving shaft and racks to rotate said gear, and means operative independent of said connecting mechanism actuated by said driving member to cause different set of rack teeth of a rack to mesh with said gear during the movement of the rack in opposite directions.

2. In a speed changing mechanism, a driving shaft, a driven shaft, a gear on said driven shaft, a plurality of racks, each having sets of teeth to alternately engage said gear, connecting mechanism coöperating with said driving member and racks to rotate said gear, and means operative independent of said connecting mechanism to raise and lower said racks during their reciprocations.

3. In a speed changing mechanism, a driving shaft, a driven shaft, a gear on said driven shaft, a plurality of racks each having sets of teeth to alternately engage said gear, oscillatory arms actuated by said driving member and operatively connected with said racks to reciprocate them, and means independent of said arms to cause said racks to rotate said gear in one direction only.

4. In a speed changing mechanism, a driving shaft, a driven shaft, a gear on said driven shaft, a plurality of racks each having sets of teeth to alternately engage said gears, oscillatory arms actuated by said driving member and operatively connected with said racks to reciprocate them, and means independent of said arms and actuated by said driving member to cause different sets of teeth of the racks to mesh with said gear when the racks are moving in reverse directions.

5. In a speed changing mechanism, a driving shaft, a driven shaft, a gear on said driven shaft, a plurality of racks constructed to mesh with said gear to rotate it in one direction only, oscillatory arms actuated by said driving member and provided with cam slots, and shoes in said slots and operatively connected with said racks to reciprocate them.

6. In a speed changing mechanism, a driving shaft, a driven shaft, a gear on said driven shaft, a plurality of racks constructed to mesh with said gear to rotate it in one direction only, oscillatory arms actuated by said driving member and provided with cam slots, shoes in said slot and operatively connected with said racks to reciprocate them, and means to adjust the position of said shoes to vary the relative speed of said driving and driven shaft.

7. In a speed changing mechanism, a driving member, a driven member, oscillatory arms actuated by said driving member, shoes adjustable on said arms and operatively connected with said driven member to drive it, and means to adjust the position of said shoes to vary the relative speed of said driving and driven members.

8. In a speed changing mechanism, a driving shaft, a driven shaft, a gear on said driven shaft, racks having sets of rack teeth to alternately engage said gear, oscillatory arms actuated by said driving shaft and provided with slots, shoes in said slots, levers actuated by said shoes and connected with said racks to reciprocate them, rack frames in which said racks are mounted, and means to raise and lower said rack frames.

9. In a speed changing mechanism, a driving shaft, a driven shaft, a gear on said driven shaft, racks having sets of teeth to alternately engage said gear, oscillatory arms actuated by said driven shaft and having slots, shoes in said slots, levers actuated by said shoes and connected with said racks to reciprocate them, rack frames in which said racks are slidable, means actuated by said driving shaft to move said rack frames relatively to said gear, and means to adjust the position of said shoes in their respective slots.

10. In a speed changing mechanism, a driving shaft, a driven shaft, a gear on said driven shaft, racks to mesh with said gear to rotate it in one direction, oscillatory arms actuated by said driving shaft and operatively connected with said racks to reciprocate them, and means coöperating with said arms to reverse the direction of rotation of said gear.

11. In a speed changing mechanism, a driving member, a driven member, a gear on said driven member, racks to mesh with said gear, oscillatory arms having slots and actuated by said driving member, shoes in said slots operatively connected with said racks to reciprocate them, means to effect relative movement of said racks and gear to cause different teeth to mesh with said gear when the racks travel in reverse directions, links connected with said shoes, and an adjusting member operatively connected with said links to vary the position of said shoes in their respective slots and thereby the relative speed of the said driving and driven members.

12. In a speed changing mechanism, a driving member, a driven member, a gear on said driven member, racks each having an upper and a lower set of teeth to alternately mesh with said gear, oscillatory arms actuated by said driving member and having slots, shoes in said slots and operatively connected with said racks to reciprocate them, means to adjust the position of said shoes, and means to effect relative movement of the racks and gear to cause the upper teeth of a rack to mesh with it when the rack is moving rearwardly and the lower teeth of the same rack to mesh with it when such rack is moving forwardly.

13. In a speed changing mechanism, a driving member, a driven member, a gear on said driven member, a plurality of racks each having sets of teeth to alternately engage said gear, rack frames in which said racks are slidable, connecting mechanism coöperating with said driving member and racks to rotate said gear, and means coöperating with said connecting mechanism to reverse the direction of rotation of said driven member.

WALTER B. JACKSON.

Witnesses:
H. S. FAIRBANKS,
C. D. McVAY.

Copies of this patent may be obtained for five cents each, by addressing the "Commissioner of Patents, Washington, D. C."